Figure 1:
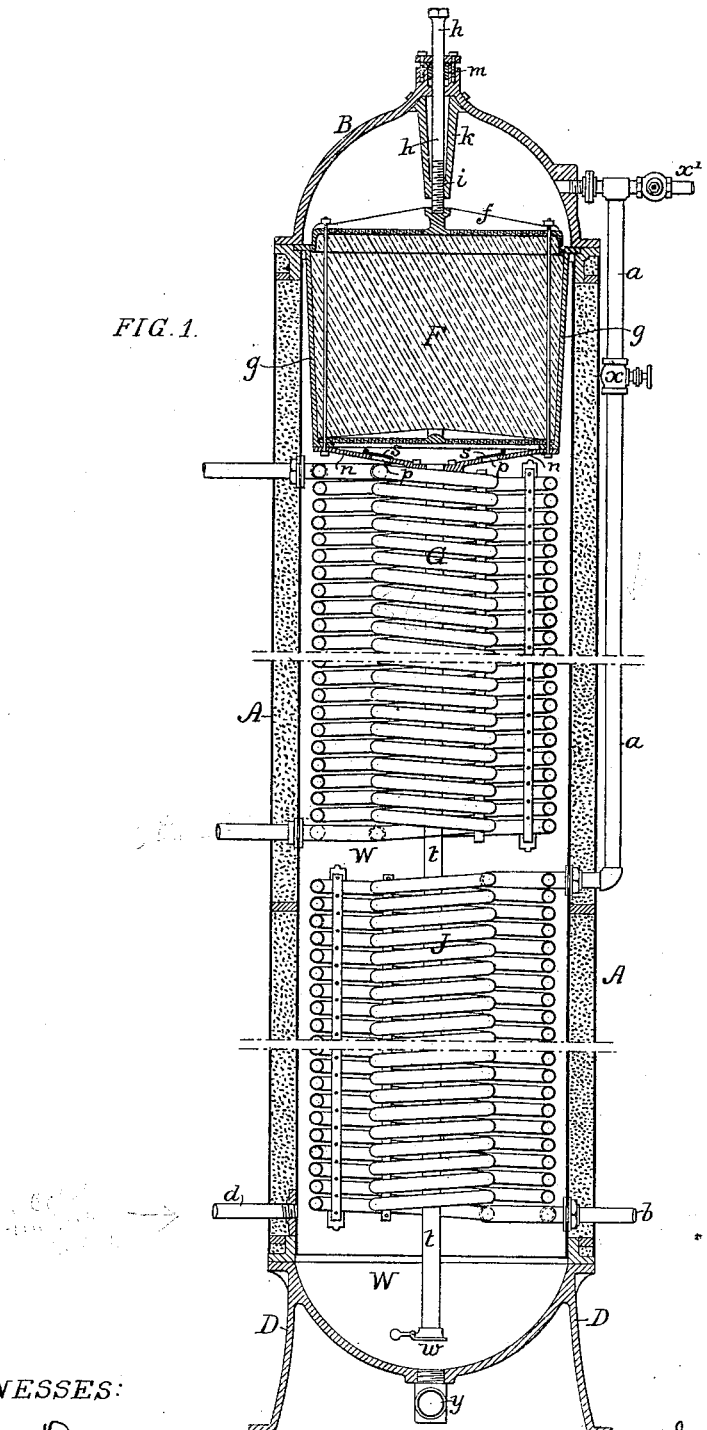

(No Model.)  2 Sheets—Sheet 1.

G. S. STRONG.
PURIFYING WATER.

No. 273,777. Patented Mar. 13, 1883.

WITNESSES:
Harry Drury
Hamilton D. Turner.

INVENTOR:
George S. Strong
by his attys.
Howson & Son

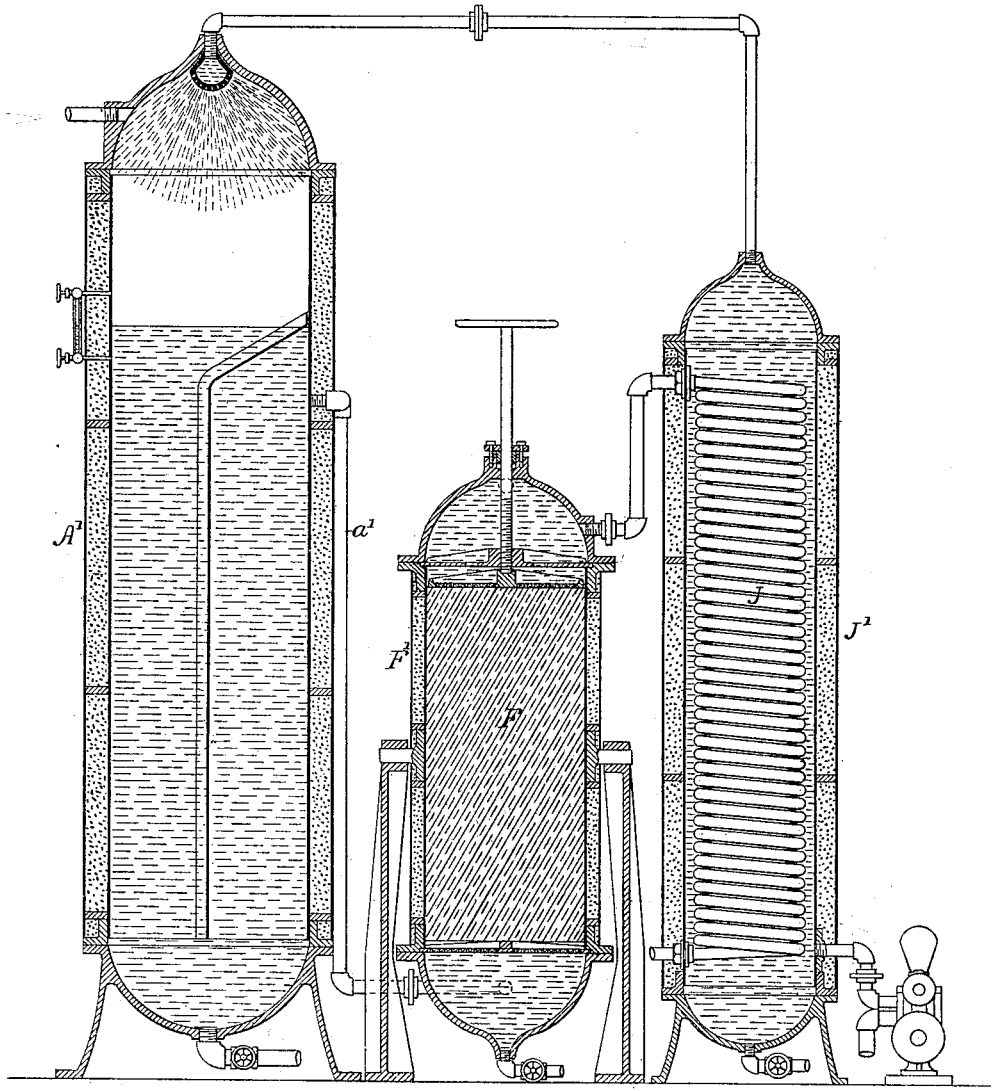

UNITED STATES PATENT OFFICE.

GEORGE S. STRONG, OF PHILADELPHIA, PENNSYLVANIA.

PURIFYING WATER.

SPECIFICATION forming part of Letters Patent No. 273,777, dated March 13, 1883.

Application filed August 18, 1882. (No model.)

*To all whom it may concern:*

Be it known that I, GEORGE S. STRONG, a citizen of the United States, and a resident of Philadelphia, Pennsylvania, have invented a certain Improvement in Purifying Water, of which the following is a specification.

My invention relates to a certain improvement in the process which I have devised for filtering water while it is heated, my present process being adapted for the purification of water which is not intended for immediate use in its heated state.

The improvement relates, further, to certain details in the construction of the apparatus whereby the process is carried out, all as hereinafter fully set forth.

In the accompanying drawings, Figure 1, Sheet 1, is a sectional view of a compact form of apparatus for purifying water in accordance with my invention; and Fig. 2, Sheet 2, a sectional view of another form of the apparatus.

In the previous application for patent filed April 1, 1882, I have described a method of purifying water by separating the impurities therefrom while the water is maintained at a high temperature and under pressure, the object being to effect the separation from the water of those salts of lime and magnesia which are soluble in water at ordinary temperatures, and are rendered insoluble at temperatures at or above the boiling-point. My present process is based on the former one, but is intended for the purification of water for steam-boilers or general purposes, or in cases where the water is not intended for immediate use in its heated state. I therefore, in carrying out the present process, cool the water after the impurities have been separated therefrom; and the essential feature of the process is the cooling of the purified water by subjecting the same to the influence of the incoming cold water, for by this means the heat extracted from the purified water is imparted to the supply of cool water, and waste of heat is thus prevented.

In Fig. 1, A represents a cylindrical casing, having a cap, B, and base D, and containing a filter, F, and two sets of coils, G and J, arranged one above the other, the filter being in the upper part of the casing. The coils G are supplied with live steam, and the coils J communicate through a pipe, $a$, with the chamber above the filter, and through a pipe, $b$, with any suitable receptacle for the purified water. Cold water is pumped through a pipe, $d$, into the lower end of the chamber W within the casing A, and as it rises in the said chamber the water is brought into contact with the coils J and G, and is then forced through the filter F from the space above which it passes through the pipe $a$ to and through the coils J, and thence to the reservoir. The live-steam coils G serve to impart the desired high temperature to the water before filtration, and after being filtered the hot water is cooled by being passed through the coils J, which are subjected to the influence of the incoming cold water, the latter being thereby heated to a comparatively high temperature before reaching the live-steam coils, the duty of which is mainly to superheat the water, so that very little, if any, heat is wasted, and the economical carrying out of the process is rendered possible.

During the operation of the apparatus it becomes desirable occasionally to compress the filtering material, and for this purpose I use a follower, $f$, which fits snugly to the interior of the filter-casing $g$ and bears upon the top of the mass of filtering material in the latter. The follower is depressed by a screw-stem $h$, which is adapted to a nut, $i$, forming part of a sleeve, $k$, bolted to the inside of the cap B, in the top of which is a stuffing-box, $m$, through which the screw-stem $h$ passes. The bottom of the filter-casing $g$ is closed by a plate, $n$, in which are openings $p$, closed by valves $s$ opening upward, and from the center of the plate $n$ a pipe, $t$, projects to a point close to the bottom of the chamber W, and is there provided with a weighted valve, $w$, opening downward.

When the apparatus is at work water passes up through the openings $p$ and through the filter; but when it is desired to clean the filter a valve, $x$, in the pipe $a$ is closed, and water is forced through a valved branch, $x'$, of said pipe into the space above the filter F, the water descending through the filter washing the impurities therefrom, and passing with said impurities through the pipe $t$ to the bottom of the chamber W, from which it is discharged directly through the blow-off pipe $y$ without disturbing or fouling the water in the chamber W or causing the deposit of dirt or scale on the coils G and J.

In Fig. 2 I have shown another form of apparatus for carrying out the process. In this case three vessels, A', F', and J', are used, the vessel F' containing the filter F and the vessel J' having the hot-water coil J; but instead of using a live-steam coil in the vessel A' the steam is admitted directly into the upper portion of the same. The cold water is pumped into the bottom of the vessel J', and, rising therein, receives its preliminary heating by contact with the coils J. From the top of the vessel J' the water is conveyed to the top of the vessel A', and is discharged from a rose or sprinkler in the form of a fine spray, being thereby brought into intimate contact with the live steam and receiving a high degree of heat therefrom. The hot water is drawn from the vessel A' through a pipe, a', being caused to take a circuitous course in the said vessel, by reason of an L-shaped partition therein, so as to afford an opportunity for the precipitation in the vessel A' of as much of the impurities as possible. From the vessel A' the hot water passes through the filter F, and finally through the coils J.

The filtering-vessel is provided with trunnions adapted to bearings in opposite frames or standards, so that the vessel can be reversed for emptying its contents; but this feature of construction, as well as the partitioned vessel A', form no part of my present invention, but are described in a separate application for patent for feed-water heater, filed by me simultaneously herewith.

In carrying out my invention it may not be necessary in all cases to heat the water above the boiling-point, as the impurities in the water may be such that they can be rendered insoluble at temperatures below the boiling-point, and instead of using live steam to effect the heating of the water before filtration hot-air pipes may be used, or the water may be passed through a pipe or vessel exposed to the direct action of the products of combustion.

I claim as my invention—

1. The mode or process herein described of effecting the purification of water, said mode consisting in heating the water, separating the impurities from the same while it is thus heated, and subjecting the heated and purified water to the action of the incoming cold water, whereby the heat is transmitted to the latter, as set forth.

2. The combination, in apparatus for effecting the purification of water, of a heating device, a filter or separator, an inlet-pipe, a discharge-pipe, and a casing or casings, all constructed and arranged substantially as set forth, whereby the cold water is caused to pass first in contact with the discharge-pipe, then under the influence of the heater, then through the separator, and finally through the discharge-pipe surrounded by the cold water, as set forth.

3. The combination of the casing A B D, the filter F, the live-steam coils G, the hot-water coils J, and the pipe a, as set forth.

In testimony whereof I have signed my name to this specification in the presence of two subscribing witnesses.

GEORGE S. STRONG.

Witnesses:
HARRY DRURY,
HARRY SMITH.